Sept. 13, 1949.  W. E. CROWL  2,481,500
ELECTRICAL MEASURING INSTRUMENT
AND CIRCUITS THEREFOR
Filed Aug. 5, 1944

INVENTOR
WILLIAM E. CROWL,
BY
Toulmin & Toulmin.
ATTORNEYS

Patented Sept. 13, 1949

2,481,500

UNITED STATES PATENT OFFICE 2,481,500

ELECTRICAL MEASURING INSTRUMENT AND CIRCUITS THEREFOR

William E. Crowl, Dayton, Ohio, assignor to The W. W. Boes Company, Dayton, Ohio, a corporation of Ohio Application August 5, 1944, Serial No. 548,270

4 Claims. (Cl. 171—95)

The present invention relates to electrical measuring instruments or systems and more particularly to those provided with several scales to indicate different ranges of measurement or in which one scale represents an amplified portion of the other.

Various schemes have been heretofore proposed by which to increase the current and/or voltage measuring range of an electrical instrument. A number of them are based on the use of shunt and series resistors of known calibrated size and these resistors are sometimes contained within the instrument and at other times are positioned exterior to the instrument depending on the amount and character of the current or voltage being measured. Thus, the ratio by which the current or voltage is divided or changed is dependent solely on the energy dissipative qualities of these resistors. The latter obviously are susceptible to change in magnitude or effect over considerable periods of time so that wide inaccuracies of measurement of voltage or current may be introduced in the instrument. Moreover, when the resistors are contained within the instrument casing they are quite often as not completely inaccessible and therefore do not offer any direct means of adjustment by which the instrument could be readily calibrated.

In view of these disadvantages there is a tendency for instrument manufacturers to make only single scale instruments, each being designed for a particular range of voltage or current so as to eliminate any possibility of applying the wrong shunt or series element and to avoid as far as possible all possibility of inaccuracy of reading due to change in the fixed resistor accessories.

A number of uses in connection with voltage regulators and reverse current relays have arisen in which it is imperative that extreme accuracy of measurement be obtained without necessitating constant calibration of the meter and it has also been found advantageous in this connection to use only one meter with a pair of scales in which the second scale represents a limited portion of the primary scale but in amplified form.

The primary object of the invention is to provide an electrical measuring system including a plural scale instrument and in which extreme accuracies of measurement of voltage or current may be obtained without the necessity for frequent calibration of the system.

The operation of the improved system is such that the second scale on the instrument is not in fact necessary but is provided merely for convenience because the single scale may be used as multiple unit indications when applying the voltage in an amplified or exaggerated form. Thus, another object of the invention is to provide an improved measuring system, including a standard form of instrument and in which the latter is employed to indicate voltages or currents with a precision found only in instruments especially designed for the range of measurement under observation.

The above objects are attained in brief by providing an instrument of the D'Arsonval or other well known type and applying to the instrument a known voltage in opposition to the voltage to be measured so that the instrument in effect measures only the difference voltage and not the total unknown voltage. It has been found that most voltmeters and particularly those of the D'Arsonval type, respond linearly not only to a range of voltage between zero and the total voltage, but also between any two voltages within that range even when there is not much difference between the two voltages.

The invention will be better understood when reference is made to the following description and the accompanying drawings in which:

Figure 2 shows the same system as Figure 1 but under different conditions of operation, while

Figure 1:
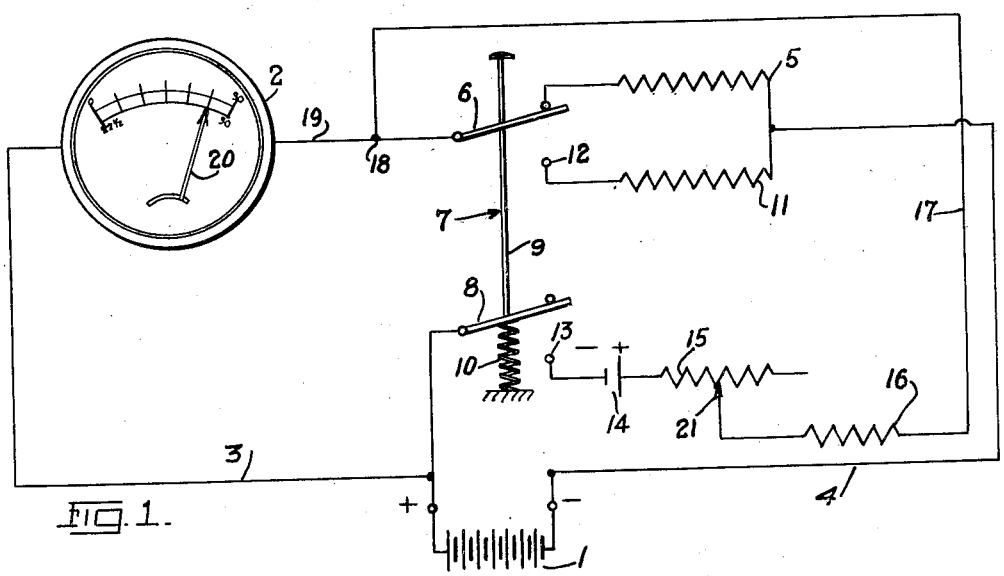
Figure 1 represents in diagram a typical form of electrical measuring instrument connected in an improved system by which any part of the total range of the instrument can be carried either on a separate amplified scale or in which readings are given on the main scale as multiple units.

Referring more particularly to Figure 1, reference character 1 represents a source of electromotive force, the voltage of which is to be measured within close limits. It will be understood that such sources of voltage may be employed in many systems or testing circuits which require extreme accuracy of response at all times and under all conditions, for example, in the case of the precise adjustment of voltage regulators and also the accurate indication of reverse current relay settings, which apparatus is used in connection with airplane accessories and elsewhere. The instrument 2 may be voltmeter of the D'Arsonval type and the voltage from the battery 1 is applied to the instrument through a conductor 3, conductor 4, the upper resistor 5 and the blade 6 of a double pole double throw switch generally indicated at 7. The switch 7 has been shown in its uppermost position.

In addition to the blade 6, the switch 7 comprises a second blade 8 rigidly attached to the other blade through a rod 9 and the latter is spring-biased upwardly as indicated at 10 so that the blade 6 normally makes contact with the circuit including resistor 5. There is a second resistor 11 arranged in parallel to the resistor 5 having a terminal 12 with which blade 6 is adapted to contact when moved downwardly as will be explained hereinafter. The resistors 5 and 11 are connected together to the conductor 4.

The blade 8 is adapted to swing downwardly against a terminal 13 connected to a circuit which includes a battery 14, an adjustable resistor 15, a fixed resistor 16, a conductor 17 to a junction point 18 on the conductor 19. The latter is connected between the instrument 2 and the switch blade 6.

The electrical measuring instrument 2 is illustrated as being of the thirty-volt, direct current type and is particularly suited to determine the voltage of batteries or other sources of electromotive force having voltages between twenty-two and a half and thirty volts.

In practice, the voltage which is normally being measured will never fall below twenty-two and a half volts so that when utilizing a meter of standard design, the needle 20 will rest at a position between twenty-two and a half and thirty volts. Many types of tests, particularly in connection with the production and operation of aeronautical instruments and accessories, necessitate the determination of the voltage between a pair of wires or between two terminals such as a source of electromotive force to a degree of accuracy within 1% or less. The critical part of the range as stated hereinbefore usually lies between twenty-two and a half and thirty volts. The system shown in Figure 1, exterior of the instrument 2, permits a very accurate determination of the voltage within the range stated.

In operation, the switch blades 6 and 8 are left in their upward position as shown and the voltage of the source 1 will be roughly indicated by the needle 20 on the upper scale. It is apparent that under these conditions, the resistor 5 constitutes the usual protective resistance and in practice may have a magnitude of about thirty thousand ohms when using a standard meter 2. In order to magnify the scale portion at which the needle or pointer comes to rest, the switch 7 is depressed in order that the blades 6 and 8 will contact the terminals 12 and 13 respectively. A circuit is now established from the conductor 19 through blade 6 through the resistor 11, through the source 1 back to the instrument 2.

Figure 2:
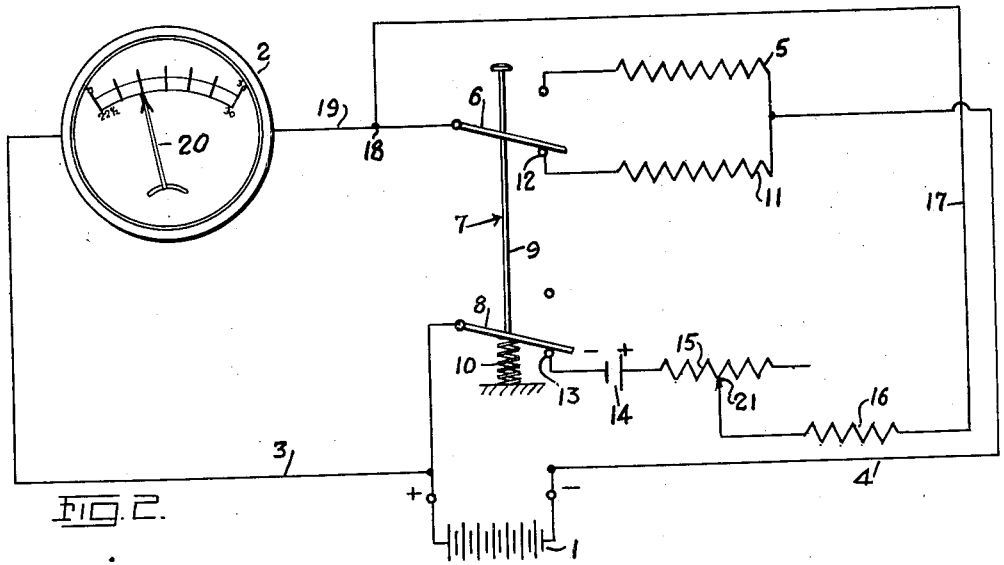

There is formed an additional circuit in opposed parallel relationship with respect to the circuit just traced, the second circuit starting at the junction point 18, passing through the conductor 17, the resistor 16, 15, the battery 14, through the blade 8 to the conductor 3 and thence back to the opposite side of the instrument. It will be noted that the battery 14 is poled oppositely to the battery 1 so that in effect, this battery applies a voltage across the instrument 2 which is opposite from the voltage applied by the source 1. It is apparent that a complete balance of these two voltages can be obtained if desired by predetermining the magnitude of the resistor 11, and also of the fixed resistor 16 and by a proper setting of the adjustable resistor 15 as will be readily observed by the inspection of Figure 2.

Figure 3:
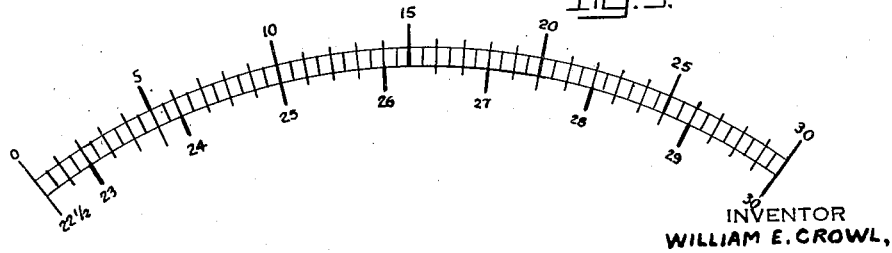
Figure 3 is a diagrammatic showing of a scale or scales which may be provided on the instrument when connected in the improved system to constitute improved measuring apparatus as a whole.

In practice, if the resistor 5 is thirty thousand ohms the resistance 11 would be of less value, for example, seven thousand ohms while the fixed resistance 16 may have a value of as low as eight hundred and fifty ohms and adjustable resistance 15 even less, for example, one hundred ohms. These values are predicated on the supposition that the battery 14 is of the one and one-half-volt type and the source of voltage 1 which is to be measured is not more than thirty volts. By carefully predetermining the size of the resistors 15 and 16 as compared to the resistor 11, the voltage effects of the battery 14 at the instrument 2 can be made fully as strong as the voltage effects of the source. In practice, the dial of the instrument 2 is set off in a voltage range between twenty-two and a half and thirty as a secondary scale which is more clearly shown in Figure 3 and the system when operated with the switch 7 in its downward position is so calibrated that the left hand mark on the dial will be twenty-two and a half volts and the right hand mark represents thirty volts. I have discovered that when using standard instruments in which the pointer moves linearly over the scale for equal increments of voltage from zero to thirty volts, a similar linear or straight line function is also present when a portion of the scale, for example, between twenty-two and a half and thirty volts is amplified by depressing the switch 7 and reading the lower indications on the dial. Thus, when the switch blades 6 and 8 are in their lower positions, the pointer 20 indicates the voltage difference between the battery 14 and the source 1 taking into account the modifying effects of the resistors 5, 11, 15 and 16.

Various other modifications of the system will readily occur to those skilled in the art and as coming with the purview of my invention which is the application of a potential to the instrument 2 having a polarity opposite from that of the original voltage and in which the instrument either indicates the difference of voltage or else indicates that the opposing voltages are equal and which also would give a measurement of the original voltage.

The net effect of applying a bucking voltage to the voltage to be measured is to permit the pointer 20 to register over its full scale the difference voltage rather than the total voltage, and thus give an amplified effect for any limited part of the scale. The part of the scale thus amplified may correspond with the upper end of the full range as illustrated or may comprise any other portion of the scale depending on the size of the resistors and the bucking battery 14 with the assurance that the same accuracy of the pointer movements will prevail regardless of the restricted range over which the pointer is required to move. The amplification of the pointer movement for a given change in voltage is clearly shown in Figure 3 in which the scale, instead of being divided into thirty parts, can be marked off into seven and a half parts (thirty minus twenty-two and a half), giving each part or division a long length across the scale. It is evident that the accuracy of the readings is increased in direct proportion to the degree with which the voltage span of the full scale is reduced. It is further apparent that when dealing with voltage measurements little or no energy is taken from the battery 14 so that the voltage determining system necessarily has a long life, and furthermore, maintains its calibration over a long period of time since there are no variable conditions after the adjustments have been once set, other than the shelf-like deterioration of the battery 14.

While I have disclosed my invention, my invention also contemplates other means of deriving the bucking potential or current as well as the battery 14 which is illustrated.

It will be understood that I desire to comprehend within my invention such modifications as come within the scope of the claims and the invention.

Having thus described my invention, what I claim as new and desire to secure by Letters Patent, is:

1. Electrical measuring apparatus comprising an instrument having a pair of scales, one of which is adapted directly to measure the voltage of unknown magnitude and the other of said scales being adapted to measure said voltage as opposed by a voltage of known magnitude obtained from a source separate from the voltage being measured, a circuit connected to said instrument for applying each of the voltages independently of one another to the instrument, said circuit including a double throw, double pole switch, each of the blades of said switch having a pair of terminals, one terminal of one pair being connected through a protective resistance to the negative side of the source of unknown voltage and the other terminal of said one pair being connected through a second resistance to the same side of the source of unknown voltage, one of the terminals of the other of said terminal pairs being connected through a source of known potential and a protective resistance to one side of the instrument and conductors from the instrument being connected respectively to the blade terminals of the switch and a conductor connected between one side of the instrument and the positive side of the source of voltage of unknown magnitude, said instrument being adapted to register on one of its scales the voltage of the source of unknown voltage when the switch is in one of its two positions and being adapted to register on the other of its scales the difference between the unknown and known voltages when the switch is moved to the other of its positions.

2. Electrical measuring apparatus comprising an instrument having a plurality of scales, one of said scales being adapted to give a direct absolute reading of the electrical quantity to be measured and another scale being an expanded replica of the last portion of the first mentioned scale, a circuit connected thereto, said circuit including a double throw, double pole switch, each of the blades of said switch having a pair of terminals, one terminal of one pair being connected through a protective resistance to the negative side of the source of unknown voltage and the other terminal of said one pair being connected through a second resistance to the same side of the source of unknown voltage, one of the terminals of the other of said terminal pairs being connected through a source of known potential and a protective resistance to one side of the instrument and conductors from the instrument being connected respectively to the blade terminals of the switch and a conductor connected between one side of the instrument and the positive side of the source of voltage of unknown magnitude.

3. In an electric measuring circuit having a meter, a plurality of scales on said meter, a fixed source of electromotive force, a normally open switch contact operable to closed position to shunt said fixed source across said meter, and a selective switch contact operable to connect a source of electromotive force to be measured in series aiding relationship with said first mentioned source of electromotive force, through one or the other of two resistors and means for connecting and disconnecting said first mentioned source of electromotive force in said circuit by the simultaneous actuation of both of said switch contacts whereby one of said scales on said meter indicates the rough approximate voltage of said source of electromotive force to be tested when said normally open switch contact is open and the other contact has connected one of said resistors in said circuit, and means wherein said fixed source of electromotive force is connected in said circuit through said other resistor by the simultaneous actuation of both of said switch contacts to close said normally open contact and operate said other contact to connect said other resistor in said circuit so that another scale on said meter indicates in expanded precise form the exact potential of said source of electromotive force being tested.

4. In an electrical measuring circuit, a meter, a plurality of indicating scales on said meter, one indicating from zero to maximum, a second indicating from an intermediate value to maximum in expanded form, a source of voltage to be measured a pair of resistors, a selective contactor operable to connect said source of voltage to be measured through one or the other of said resistors in shunted relationship across said meter, a second source of voltage, an adjustable resistor serially connected with said second source of voltage, a normally open switch contactor for connecting said second source of voltage in parallel with said meter and said first mentioned source of voltage to be measured, and common means for operating said contactors so that said first mentioned zero to maximum scale of said meter is effective to indicate the voltage of said source being measured when said normally open contactor is open to disconnect said second mentioned source of voltage from said circuit and said selective contactor has connected said source of voltage to be measured through one of said resistors, and said second scale reading from intermediate to maximum position is effective to indicate the exact voltage of said first mentioned source when said common means is actuated to close said normally open contactor to connect said second source of voltage in parallel series aiding relationship with said first mentioned source of voltage and said meter and to operate said selective contactor to connect said source of voltage to be measured through the other of said resistors.

WILLIAM E. CROWL.

REFERENCES CITED

The following references are of record in the file of this patent:

UNITED STATES PATENTS

| Number | Name | Date |
| --- | --- | --- |
| 395,974 | Hayes et al. | Jan. 8, 1889 |
| 1,039,925 | Gati | Oct. 1, 1912 |
| 1,811,319 | Johnson | June 23, 1931 |
| 2,179,333 | Horsley | Nov. 7, 1939 |
| 2,229,009 | Berry | Jan. 14, 1941 |
| 2,240,184 | Hathaway | Apr. 29, 1941 |
| 2,355,068 | Graves | Aug. 8, 1944 |